July 1, 1947.  E. LABIN  2,423,104

DIRECTION INDICATING APPARATUS

Filed March 13, 1941

INVENTOR.
EMILE LABIN
BY
ATTORNEY.

Patented July 1, 1947

2,423,104

UNITED STATES PATENT OFFICE 2,423,104

DIRECTION INDICATING APPARATUS

Emile Labin, New York, N. Y., assignor to International Standard Electric Corporation, New York, N. Y., a corporation of Delaware Application March 13, 1941, Serial No. 383,108

7 Claims. (Cl. 250—1.62)

This invention relates to improvements in direction indicating apparatus, and in particular to improved means for simultaneously indicating three dimensions.

It is an object of the invention to provide improved apparatus for indicating the location of an object.

Another object is to provide improved means for simultaneously giving a single indication of three dimensions.

A further object is to provide relatively simple indicating means for showing with a single indication the elevation, azimuth, and distance to an object.

Still another object of the invention is to provide improved means for aiding an aeroplane pilot to seek and pursue an objective.

Another object resides in the provision of improved means for enabling the pilot of an aeroplane to pursue and destroy an enemy plane.

It is also an object to provide easily readable means for accurately following a moving object.

Other objects and various further features of novelty and invention will hereinafter be pointed out or will become apparent to those skilled in the art from a reading of the following specification in conjunction with the drawings included herewith.

In said drawings—

Figure 1:
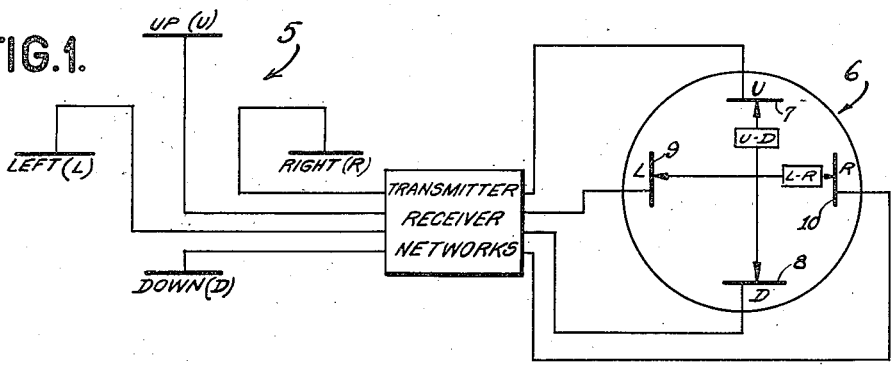
Fig. 1 is a schematic showing of apparatus embodying features of my invention simplified for the purpose of explanation.

Broadly speaking, the purpose of equipment embodying features of my invention may be considered as twofold. By giving an accurate indication of all objects, particularly other aeroplanes, the pilot of a fighter plane may be warned of the presence of other planes within a given radius (depending on the sensitivity of the apparatus) and he may manoeuver his machine for pursuit and combat with an enemy plane. Since the controls and instruments to be observed in a modern fighter plane are so numerous and complicated, it will be appreciated that indications for enabling a pilot to track his enemy must be made as simple as possible. In accordance, therefore, with features of my invention a scheme is proposed for giving a single indication of the distance of an enemy plane, whether that plane is above or below the pilot's machine and also whether it is to the left or to the right of his craft.

In a preferred form of my invention I employ well-known distance indicating means, preferably of the type employing an impulse energy transmission and a receiver responsive to reflection of such energy, said receiver including a cathode ray tube upon which the delay of such energy in its transmission and reflection may be clearly read. Various schemes employing this principle have been proposed but I prefer to use one in which the visual indication on the cathode ray screen is a single spot, displaced along a linear axis from a given reference origin in an amount proportional to the distance to the reflecting object.

In accordance with features of my invention I provide appropriate means for applying potentials to control electrodes in the cathode ray tube to treat such a delayed impulse spot so that the reading obtained will represent at once the elevation, azimuth, and distance to the reflecting object. To this end, and viewing the schematic showing in Fig. 1, I provide directive antenna means 5, directionally responsive to signals which are received generally in four quadrants, and this antenna means may be disposed according to well-known methods upon the wing tips and fuselage of the fighter craft as may be desired. In the drawing I have shown the antenna means 5 according to the proposed directional sensitivity of each element. For example, the antenna member designated as up (U) represents antenna means directionally responsive to energy coming from a source or reflection generally above the line of flight of the fighter craft. Other antenna elements have been designated as right (R), down (D), and left (L), and these other antenna elements are likewise directionally responsive in their respective senses, as will be clear.

In a preferred form, I apply energy received by the various members of antenna means 5 to the deflection plates of a cathode ray oscillograph or indicating device 6, substantially as follows: In order to make the reading obtained as realistic as possible, I prefer to set up the cathode ray tube 6 so that one pair of deflection plates may be employed for vertical deflections and the other pair for horizontal deflections. The beam is swept between these vertical plates at a rate generally determined by the sweep generator, and the beam is rendered bright at the instant of receipt of reflected pulses to provide an indication of distance. Between the vertically disposed plates 7, 8 I provide means for also impressing a resultant or differential of energy received by the up and down antenna elements; and this potential has been shown schematically as U—D. It will thus be appreciated that, depending upon which of these two antenna elements receives more energy than the other, the deflection potentials between plates 7, 8 will be suitably polarized causing deflection with respect to the normal sweep dependent upon the applied signals. In a similar manner I provide means for impressing between the other plates 9, 10 a potential proportional to the differential of energy received by the left and right antenna elements, shown schematically as L—R.

In order to obtain a more easily readable indication I prefer to apply the above-mentioned deflection potentials for an instant of time substantially equal to the duration of the impulses, and to supply appropriate circuit delay means for permitting cathode emission a short while longer than the duration of the impulses. It will then be appreciated that the impulse may be used to indicate distance, as outlined above, and also, when the deflecting potentials are applied, a transient in the travel of the electron beam over the fluorescent screen may be observed as a line extending generally in the direction of the resultant of the potentials applied between plates 7 and 8, and 9 and 10, as will be clear.

It is to be understood in reading the above discussion in connection with Fig. 1 that the showing is purely schematic. For purposes of simplicity details as to circuits in the block labelled "Transmitter receiver networks" have been omitted, for such details are considered to be sufficiently disclosed in connection with Fig. 2.

Figure 2:
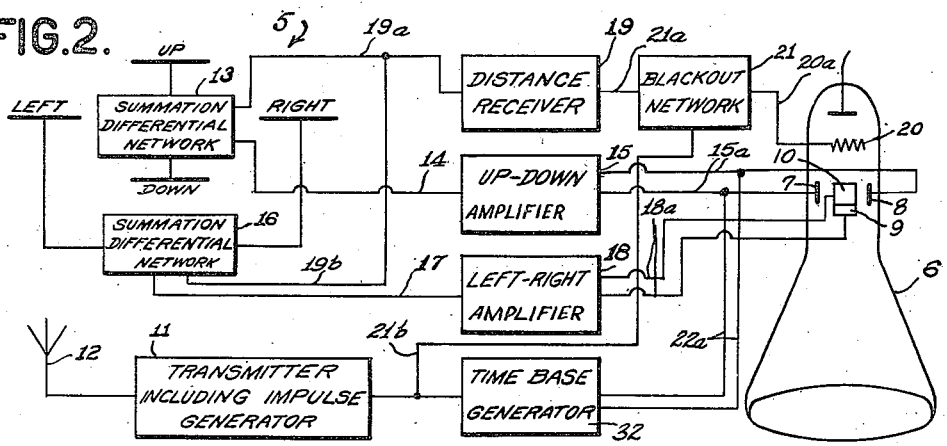
Fig. 2 is a schematic block diagram showing in more detail further features of the invention.

In Fig. 2, I show in block diagram, possible circuit means for obtaining direction indications in accordance with features of my invention. In the circuit of this diagram an impulse generator of known form may be employed periodically to supply a short impulse to a transmitter 11, which is shown as including the impulse generator. Energy so generated for transmission may then be fed into space by an antenna 12 of well-known form—preferably so that radiation is uniform in a generally forward direction. Now if there be some reflecting object, say an enemy plane, within range of the energy so transmitted, such energy will be reflected and some of such reflected energy may be picked up by the directive antenna array 5. Recalling the discussion above in connection with appropriate potentials for the deflecting electrodes, I provide appropriate network means 13, in the case of the up (U) and down (D) antenna elements for detecting such energy and obtaining a sum and a differential thereof as received by these respective elements. This may be called a summation differential network as it serves to combine energy from the antenna units to give an additive result and a subtractive result for purposes explained hereinafter. Such a differential of energy may then be fed by means of a line 14 to suitable amplifier means 15 for amplifying and otherwise treating the up-down energy for application via line 15a to plates 7 and 8. In a similar way a network 16 may be employed for obtaining a resultant differential of the energy received by left and right antenna elements; and this energy may be fed by line 17 to suitable amplifier means 18, which may be similar to amplifier 15 above in connection with the U—D deflection potential. From amplifier 18 the left-right energy is delivered via line 18a to plates 9 and 10.

In the preferred form shown I employ the same antenna array 5 to pick up energy for deriving the distance or time-delay indication. It will be appreciated that in order to obtain a uniform strength distance indication the antenna must be non-directional. Accordingly, in a preferred form the networks 13 and 16 may include means for adding or combining the energy picked up by the respective antenna elements and for relaying such summation energy to distance receiver means 19 over lines 19a and 19b. The receiver 19 will be understood to include appropriate detection, amplification and other means for singling out the delayed impulses for eventual application over line 21a to blackout network 21 which in turn is connected over line 20a to a cathode ray tube control element 20 serving as a blackout electrode.

In the practical operation of the circuit of Fig. 2 it will be appreciated that a time base generator 32 or the equivalent may be operated in synchronism with the impulse generator of transmitter 11 and employed for sweeping the cathode ray beam successively across the distance indicating axis or scale. In the preferred form shown this sweeping energy is applied over line 22a to deflection plates 7 and 8, that is, the sweep energy is superimposed upon the up-down differential potentials which are applied to plates 7 and 8 from amplifier 15 via line 15a. It is to be understood of course, that the distance indicating scale may be made to extend in any desired direction by appropriate energization of the deflection plates, but I prefer to arrange the distance indicating scale vertically for purpose of obtaining more realism in the readings. As I have mentioned above I prefer to employ a single spot on the cathode ray screen for distance indication. In the form shown, such a spot may be obtained by means of a black-out network 21 for so biasing a control electrode 20 of the cathode ray tube that no emission takes place to form a spot on the screen until a delayed impulse is received. The network 21 is controlled for this purpose by energy delivered over line 21a from distance receiver 19. If necessary for insuring the proper operation (i. e. suppression of emission except at the time of reception of a reflected pulse) the network 21 can be further controlled from transmitter 11 over line 21b.

Figure 3:
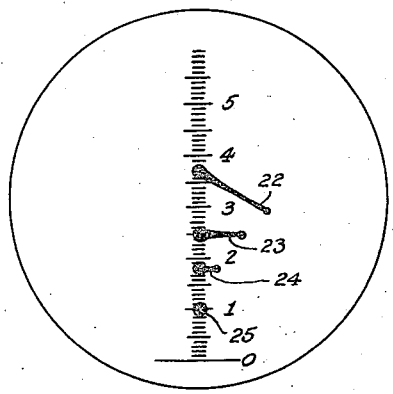
Figs. 3 and 4 represent typical readings obtainable with apparatus embodying features of my invention.

To illustrate the manner in which indications may be obtained in accordance with the invention as illustrated in Fig. 2 let us consider indication 22 on the face of the instrument shown in Fig. 3. From the above discussion it is clear that this indication identifies a reflecting body or enemy craft about 3.7 miles distant, to the right and below the plane and direction of flight of the pursuit ship carrying the instrument. This indication is obtained as follows.

Recalling the operation of blackout network 21, this circuit permits an indication to be obtained on the screen of tube 6 only at the instant when reflected impulses are received. As also indicated above, the time base generator, supplying a sawtooth wave for example, periodically applies sweeping potentials along an axis, which may be the graduated axis of Fig. 3, in synchronism with transmission of impulses. Reflections of these transmitted impulses may be received by the apparatus after a certain delay interval corresponding to the time of combined transmission and reflection, and hence corresponding to the distance to the reflecting body. It follows that at the instant a reflected impulse is received, that is, when the blackout network permits generation of an electron beam in tube 6, a potential has already been applied to the deflection plates which operate to deflect along the graduated axis of Fig. 3 and this deflecting potential assures that the indication obtained will begin its record on the screen of tube 6 at a point on the graduated scale thereof indicative of distance to the reflecting body.

Almost simultaneously with application of the above-mentioned "distance" deflecting potential, and within the duration of inoperativeness of blackout circuit 21, directional deflection potentials are simultaneously applied to the deflection means associated with tube 6. As will be recalled, these potentials are preferably simultaneously obtained from antenna 5 as follows: The energy received by the up and down directionally responsive elements of antenna 5 is fed to network 13 where after detection it may be fed to the differential portion of network 13, whereby a differential or resultant indication of whether the reflecting body is up or down with respect to the fighter craft may be obtained in line 14. Amplification of such resultant energy may be accomplished by amplifier 15 and relayed to, say the vertical set of deflection plates of tube 6. At the same time and in the same manner the left and right directionally responsive elements of antenna 5 supply energy to network 16, whereby a differential voltage is obtained. This differential voltage may then be amplified by receiver 18 and supplied to the horizontal deflection plates of tube 6. Thus it is possible to provide one pair of deflection plates with potentials indicative of whether the reflecting body is up or down simultaneously with provision of potentials representative of the right or leftward position of the reflecting body. It is clear that by simultaneously applying these two coordinate "direction" potentials to the deflecting means of tube 6 the cathode ray spot on the screen thereof may be distended in a direction indicative of the resultant of the "direction" deflection potentials. In the case of spot 22, then, evidently the differential portion of network 13 produced a resultant potential indication of predominant reception from the "down" element of antenna 5; and the differential portion of network 16 produced a resultant potential indication of predominant reception from the "right" element of antenna 5, as will be clear.

It is to be understood that the showing in Fig. 2 is purely schematic and has been made as simple as possible the better to illustrate the principles of my invention. It will, therefore, be appreciated that certain elements which appear to have been left out may be considered as included within the various blocks of the diagram. For example, the various amplifiers and receiver may also include blocking networks operated in synchronism with the transmitter for assuring that the transmitted impulses are in no way effective upon the receivers until they are picked up in the manner described above after reflection from a distant object.

By way of illustration possible preferred operating conditions may be mentioned in connection with Fig. 2. Since the speed of aeroplanes is so great nowadays, it is to be recommended that the cone of survey possible with the apparatus described be open enough to avoid surprise attacks from certain angles, and further that the range of operation extend up to, say, 3 or 5 miles. From a consideration of range, it would seem that wave lengths below 1 meter should fulfill requirements of such devices. As the desired accuracy, say 1 to 2 degrees, may be obtained by waves of lengths in the neighborhood of 1 meter, choice may be made from the standpoint of reliability of the transmitter and receiver, power needed to cover the broad scanning angle, and size of antenna capable of giving this angle of scanning; all from the point of view of installation on a fighter plane. At present I prefer operating on a wave length of about 50 cm.

Figure 4:
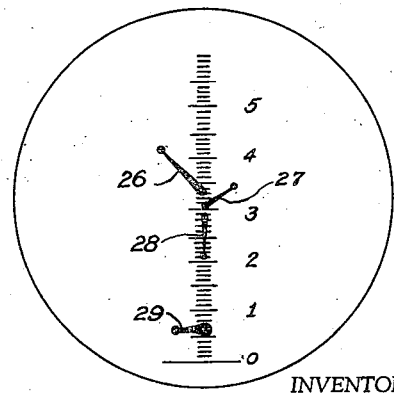

Figs. 3 and 4 show possible readings obtained with apparatus which has thus far been described. It will be observed that, in accordance with a desirable feature, distance markings have been indexed generally vertically and diametrically across the tube face. By way of illustration the indications or markings shown in Fig. 3 represent successive readings obtained as a fighter pilot may sight his enemy and then be pursuing him. Let us assume that the first indication of the enemy that is obtained is a mark 22. From an appreciation of the above discussion in connection with deflection plate potentials it will be clear that the mark 22 indicates the enemy to be approximately 3.8 distance units or miles away, off to the right, and slightly below the plane of flight of the fighter machine. As the fighter pilot begins pursuit he will bank to the right and catch up with the enemy so that a succeeding mark on the tube face might appear as 23, at which instant of time the enemy is approximately 2½ miles distant, to the right of, and in the same plane as that of the fighter's machine flight. At this instant the fighter plane may still be in a gentle bank in order to encounter his enemy, but the fact that the mark 23 is shorter than mark 22 indicates that the pilot has manoeuvered his machine that much more in line with the enemy craft. A succeeding mark 24 shows the enemy to be approximately 1.7 miles distant, and almost directly ahead, as will be seen. Finally, a single reading such as 25 will be obtained, and this reading shows the enemy close at hand and directly in line with the attacking machine. Having once obtained such a reading, all the pilot has to do is to maintain the image 25 as a single spot and make it move down the scale towards zero by giving fast pursuit. If desired, either a duplicate cathode ray tube may be provided with an appropriately reduced distance scale to indicate when the enemy plane is within range of the pursuit plane's fire, or suitable switching means may be provided in connection with the cathode ray tube to enable scale multiplication for conditions under which the pilot may fire, as will be clear.

In Fig. 4, I show a situation in which the advantages of my indicating apparatus will be immediately apparent. It will be noted that at slightly different distances of about 3 miles the marks on the screen form a generally star-shaped pattern including three slightly spaced marks 26, 27, 28 respectively. Such an indication may be taken to mean that at that range there is a flight of three other aircraft, one straight ahead and a little below the pursuit machine, one somewhat to the right and a little above, and a third above and to the left all nearly the same distance away. It will further be noted that the mark 26 is considerably longer than 27 or 28. Such an indication may mean either of two things—either the formation of enemy craft includes one large machine, say a bomber, escorted by two fighter planes, or the machine giving the reading 26 is farther to the left and above than are the machines represented by 27 and 28 in their respective senses, with respect to the line of flight of the pursuit plane, as will be clear. If two or more craft are the same distance from the indicator they will produce only one resultant indication. This condition will, however, not be sustained for any appreciable length of time since the craft are all in motion. The reading shown in Fig. 4 also includes by way of illustration another indication 29, which means a plane at about 0.8 of a mile, on a level with, and to the left of the pursuit plane. Such an indication may be typical when the pursuit plane is accompanied by another friendly machine.

It will be clear that I have described a relatively simple means for simultaneously indicating not only the distance of an enemy plane or object, but also the right or left, up or down disposition of that plane or object. It will also be appreciated that this means is so simple as to reading obtained that even a cluster of enemy craft all at the same distance will not interfere with a proper interpretation of the reading obtained. By making the application of deflection potentials small with respect to the duration of the impulses it will be appreciated that the distance indication may be a relatively large spot as compared with the end of any particular mark obtained. Such a proportioning of the mark will be most appreciated when it extends along the distance-indicating scale, since the large spot will always indicate distance and no confusion as to distance can result from such a mark. If desired, an additional appearance of approach to the enemy may be created by suitable focusing means responsive to a decrease in the time delay of impulses so that the distance-indicating spot may increase as the pursuit pilot approaches the enemy, as will be clear.

Furthermore, it is to be understood that while the invention has been described particularly in connection with apparatus carried by a pursuit plane, the invention may be readily adapted to anti-aircraft land or ship batteries; and heavier and more sensitive apparatus may be employed in the latter case to give more sensitive and correct readings to cover even greater ranges. It will be appreciated, moreover, that since the distance-indicating means per se forms no part of the invention, any known system for such indication may be employed.

While the invention has been described in particular detail in connection with the preferred form shown, it will be clear that many modifications, additions, and omissions may be made without departing from the scope of the invention.

What I claim is:

1. In an indicating apparatus for providing distance indications and indications of relative position with respect to the apparatus, receiver means including antenna means, detecting and amplifying means, and cathode ray tube indicating means having two pairs of deflection plates, a time base generator, means for applying energy from said time base generator to one pair of said deflection plates to provide a distance scale, said antenna means including means directionally sensitive to energy received generally above said receiver means, means directionally sensitive to energy received generally below said receiver means, means directionally sensitive to energy received generally to the left of said receiver means, and means directionally sensitive to energy received generally to the right of said receiver means, said detecting and amplifying means including connecting means for applying energy received by the first two mentioned of said directionally sensitive means to one pair of said deflection plates, and connecting means for applying energy received by the last two mentioned of said directionally sensitive means to the other pair of said deflection plates to provide position indicating deflections of the beam of said cathode ray tube.

2. In an indicating apparatus, receiver means including antenna means, detecting and amplifying means, and cathode ray tube indicating means having two pairs of deflection plates, time base generator means, means for applying energy from said time base generator means to said deflection plates to provide a regular timed deflection of the cathode ray beam, to provide a distance scale, said antenna means including means directionally sensitive to energy received in a pair of mutually perpendicular senses about said receiver means, said detecting and amplifying means including connection means for applying energy received in one of said senses to one of said pairs of deflection plates, and connecting means for applying energy received in the other of said senses to the other of said pairs of deflection plates to provide position indicating deflections of the beam of said cathode ray tube.

3. In an indicating apparatus, transmission means for periodically transmitting impulse energy, receiver means including directionally sensitive antenna means, detecting and amplifying means, and cathode ray tube indicating means, said cathode ray tube including a pair of deflection plates and further auxiliary electrode means, means in synchronism with the transmission of said impulse energy for applying beam-sweeping potentials to opposite deflection plates in said cathode ray tube, said detecting and amplifying means including connecting means for applying received reflected impulse energy to said auxiliary electrode means, and connecting means for applying energy directionally received by said antenna means to said deflection plates.

4. In an indicating apparatus, means for periodically transmitting impulse energy, receiver means responsive to and for detecting reflections of said impulse energy, said receiver means including directionally sensitive antenna means, detecting and amplifying means, and cathode ray tube indicating means having a pair of deflection plates and further auxiliary electrode means, connecting means connecting said detecting and amplifying mean and supplying received directional energy to said deflection plates, means for sweeping the beam of said tube along a linear axis in synchronism with the frequency of transmission of said impulse energy, said receiver means also including means responsive to said received reflected impulse energy for permitting cathode emission in said tube only when a reflected impulse is received.

5. In an indicating apparatus, transmitter means for periodically transmitting impulse energy, receiver means including cathode ray indicating means operated in synchronism with the periodic transmission of said impulse energy and responsive to reflections of said impulse energy for giving an indication of the distance traveled by such reflected impulse energy, said receiver means further including directive antenna means directionally discriminatory in a plane passing through said receiver and directive antenna means directionally discriminatory in a plane generally perpendicular to said first-mentioned plane and passing through said receiver, connecting means including detecting and amplifying means for relaying energy received by said first-mentioned directive antenna means to one pair of deflection plates in said cathode ray indicating means, and connecting means including detecting and amplifying means for relaying energy received by said second-mentioned directive antenna means to another pair of deflection plates in said cathode ray indicating means.

6. In an indicating apparatus, an impulse energy generator, a cathode ray tube having two pairs of deflection plates and a black-out electrode, means for applying beam-sweeping energy between a pair of said deflection plates, means for indicating delay of said impulse energy, said means including means responsive to said impulse energy for rendering said black-out electrode effective to permit cathode emission and receiver means including antenna means directionally responsive to energy received in a two-coordinate system, means responsive to energy received in one sense for applying such energy to one pair of said deflection plates, and means responsive to energy received in another sense for applying such energy to the other pair of said deflection plates.

7. A radio distance and position indicating apparatus comprising a cathode ray tube having a screen with a distance scale thereon, and horizontal and vertical deflecting means, a receiver, means for controlling the cathode ray beam to establish on said scale a first point indicative of the distance of an object from said receiver, and means responsive to the output of said receiver for deflecting said beam to a second point bearing a position relative to said first point indicative of the position of said object in a two coordinate sense relative to said receiver and establishing on said screen a line between said points.

EMILE LABIN.

REFERENCES CITED

The following references are of record in the file of this patent:

UNITED STATES PATENTS

| Number | Name | Date |
|---|---|---|
| 2,003,933 | Greig | June 4, 1935 |
| 2,143,035 | Smith | Jan. 10, 1939 |
| 2,207,267 | Plaistowe | July 9, 1940 |
| 2,227,598 | Lyman | Jan. 7, 1941 |
| 2,189,549 | Hershberger | Feb. 6, 1940 |
| 2,216,707 | George | Oct. 1, 1940 |

FOREIGN PATENTS

| Number | Country | Date |
|---|---|---|
| 520,081 | Great Britain | Apr. 15, 1940 |
| 526,658 | Great Britain | Sept. 23, 1940 |